(12) United States Patent
Marcepoil et al.

(10) Patent No.: US 10,189,220 B2
(45) Date of Patent: Jan. 29, 2019

(54) CALCULATION SYSTEM FOR MANUFACTURING AN OPHTHALMIC LENS

(71) Applicant: Essilor International, Charenton le Pont (FR)

(72) Inventors: Laurent Marcepoil, Charenton le Pont (FR); Sebastien Maurice, Charenton le Pont (FR); Luc Martin, Charenton le Pont (FR); Benoît Holvoet Vermaut, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 438 days.

(21) Appl. No.: 14/784,152

(22) PCT Filed: Apr. 16, 2014

(86) PCT No.: PCT/US2014/057779
§ 371 (c)(1),
(2) Date: Oct. 13, 2015

(87) PCT Pub. No.: WO2014/177387
PCT Pub. Date: Nov. 6, 2014

(65) Prior Publication Data
US 2016/0052217 A1  Feb. 25, 2016

(30) Foreign Application Priority Data

Apr. 29, 2013 (EP) .................................... 13305565

(51) Int. Cl.
*B29D 11/00* (2006.01)
*G05B 19/418* (2006.01)

(52) U.S. Cl.
CPC .. *B29D 11/00961* (2013.01); *G05B 19/41865* (2013.01); *G05B 2219/2237* (2013.01);
(Continued)

(58) Field of Classification Search
CPC ................................................ B29D 11/00961
See application file for complete search history.

(56) References Cited

U.S. PATENT DOCUMENTS 4,360,877 A * 11/1982 Langston ............... G06Q 50/06
700/283
4,628,508 A * 12/1986 Sager .................... G06F 11/203
700/82

(Continued)

FOREIGN PATENT DOCUMENTS

EP       2 199 021      6/2010
WO   WO 2009/068613    6/2009

*Primary Examiner* — Jennifer L Norton
(74) *Attorney, Agent, or Firm* — Oblon, McClelland, Maier & Neustadt, L.L.P.

(57) ABSTRACT

A calculation system (1) for manufacturing an ophthalmic lens. A set of calculation modules ($M_1$, $M_2$, $M_3$, $M_4$) is associated to partial calculation in relation with manufacturing process of said ophthalmic lens. A managing unit (MU) is configured to: receive input data, and calculate output data through one or several iteration(s) of: determining one or several calculation module(s) to be activated, determining an order of activation of the one or several calculation module(s), and activating the determined one or several calculation module(s), in accordance with the determined order of activation. The managing unit transmits an indication that the output data have been calculated.

14 Claims, 3 Drawing Sheets

(52) U.S. Cl.
CPC .............. *G05B 2219/32036* (2013.01); *G05B 2219/34417* (2013.01); *G05B 2219/36103* (2013.01); *G05B 2219/45175* (2013.01); *Y02P 90/20* (2015.11)

(56) References Cited

U.S. PATENT DOCUMENTS

| | | | |
|---|---|---|---|
| 5,331,315 A * | 7/1994 | Crosette ............ | G06F 15/17343 |
| | | | 700/245 |
| 5,428,553 A * | 6/1995 | Chiba .................... | H02H 3/00 |
| | | | 700/293 |
| 7,693,594 B2 * | 4/2010 | von Helmolt .......... | G06Q 10/06 |
| | | | 700/100 |
| 9,961,009 B2 * | 5/2018 | Sussman ................ | H04L 47/622 |
| 2001/0050752 A1 | 12/2001 | Shirayanagi | |
| 2002/0072875 A1 | 6/2002 | Barney et al. | |
| 2006/0287742 A1 * | 12/2006 | Khan .................. | G06F 15/7842 |
| | | | 700/90 |
| 2007/0021847 A1 * | 1/2007 | Hyodo ................. | G05B 19/042 |
| | | | 700/20 |
| 2011/0029140 A1 | 2/2011 | Jordan et al. | |
| 2011/0093854 A1 * | 4/2011 | Blanc .................... | G06F 9/5066 |
| | | | 718/101 |
| 2016/0046090 A1 * | 2/2016 | Allione ............ | B29D 11/00961 |
| | | | 351/159.74 |
| 2018/0194566 A1 * | 7/2018 | Schneider .............. | B65G 37/02 |

* cited by examiner

CALCULATION SYSTEM FOR MANUFACTURING AN OPHTHALMIC LENS

RELATED APPLICATIONS

This is a U.S. national stage application under 35 USC § 371 of International application No. PCT/EP2014/057779, filed on Apr. 16, 2014. This application claims the priority of European application no. 13305565.7 filed Apr. 29, 2013, the entire content of which is hereby incorporated by reference.

FIELD OF THE INVENTION

The invention relates to a calculation system for manufacturing an ophthalmic lens.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Ophthalmic lens is commonly used for correcting many different types of vision deficiencies of a wearer of the ophthalmic lens. These include defects such as near-sightedness (myopia) and far-sightedness (hypermetropia), astigmatism, and defects in near-range vision usually associated with aging (presbyopia).

An ophthalmic lens is typically made of plastic or mineral material and generally has two opposing surfaces which co-operate with one another to provide a required refractive property, generally corresponding to the wearer's prescription.

Currently, for providing an ophthalmic lens, an eye care practitioner orders the ophthalmic lens at an ophthalmic lab by sending an order request to the ophthalmic lab. The order request comprises wearer data, for example the wearer's prescription, and optionally other wearer's parameters, such as a head/eye movement coordination parameter and/or an eye rotation center. The order request further comprises spectacle frame data, for example the type of spectacle frame the wearer has selected, and lens data, for example the type of ophthalmic lens the wearer has selected.

The ophthalmic lab receives the order request and sends it to an ophthalmic lens designer. The lens designer uses the data comprised in the order request to calculate an ophthalmic lens design, by using an ophthalmic lens calculator. The ophthalmic lens design comprises optical data of the ophthalmic lens to be provided to the wearer, and manufacturing process data related to the manufacturing process of the ophthalmic lens.

The ophthalmic design determined by the lens designer is sent to the ophthalmic lab and the ophthalmic lens is manufactured based on the calculated design. The manufacturing process may for instance comprise a blocking step, a surfacing step, a polishing step and a marking step.

The current ophthalmic lens manufacturing process presents some drawbacks.

Firstly, each ophthalmic lab has its own management entity, and its own apparatus and tools. Consequently, each lens designer has to be adapted to calculate manufacturing process data for the different ophthalmic labs.

This may be achieved by using, in the ophthalmic lens calculator, a database containing ophthalmic labs data related to the different labs. However, some labs data may not be obtained or updated, and this may result in performing a manufacturing process based on incorrect calculated manufacturing process data.

In a similar way, each ophthalmic lab has to be adapted to perform a manufacturing process based on manufacturing process data calculated by different lens designers. In particular, some lens designer calculators are configured to compute all the necessary information (optical information and manufacturing information) to manufacture an ophthalmic lens in a single calculation, while other lens designer calculators are mainly focused on optical calculations, and not as much on how to manufacture the design.

Secondly, the manufacturing process data are calculated prior to the beginning of the manufacturing process, and it is not possible to recalculate some of the manufacturing process data during the manufacturing process, for example to update the manufacturing process data based on measured process data. This may result in a lack of precision.

SUMMARY OF THE INVENTION

One object of the invention is to provide a calculation system for manufacturing an ophthalmic lens that does not present the drawbacks mentioned hereinabove.

To this end, one aspect of the invention is directed to a calculation system for manufacturing an ophthalmic lens, comprising:

a set of calculation modules 1 to N, N being an integer higher than or equal to 1, each calculation module being associated to a partial calculation in relation with manufacturing process of said ophthalmic lens, each calculation module being configured to be activated independently and asynchronously from another calculation module, a managing unit configured to:
  receive input data, the input data being related to the manufacturing process and/or to an ophthalmic lens manufacturing system configured to manufacture the ophthalmic lens,
  calculate output data related to the manufacturing process from the input data, through one or several iteration(s) of:
    determining one or several calculation module(s) to be activated,
    determining an order of activation of the one or several calculation module(s) to be activated,
    activating the determined one or several calculation module(s), in accordance with the determined order of activation, and
  transmit, to the ophthalmic lens manufacturing system, an indication that the output data have been calculated, and make the output data available to the ophthalmic lens manufacturing system.

According to an embodiment of the invention, the managing unit is embedded in a master module, each calculation module being a slave calculation module configured to be activated by the master module.

According to another embodiment of the invention, the calculation system comprises N managing units, each calculation module comprising one of the said N managing units, one calculation module being determined as managing module for an output data calculation, depending on the received input data.

According to an embodiment of the invention, the set of calculation modules comprises at least one optical calculation module, configured to calculate values of optical parameters related to the ophthalmic lens to be manufactured, the optical parameters comprising geometrical parameters related to the ophthalmic lens. In this embodiment, the input data may comprise a request to calculate values of the optical parameters, the input data further comprising prescription data for the wearer of the ophthalmic lens.

According to an embodiment of the invention, the set of calculation modules comprises at least one manufacturing calculation module, configured to calculate values of ophthalmic lens manufacturing process parameters. In this embodiment, the input data may comprise a request to calculate values of the manufacturing process parameters. The request to calculate values of the manufacturing process parameters may specify one or several manufacturing step(s) to be performed. The output data may further specify one or several manufacturing step(s) to be performed.

The at least one manufacturing calculation module may be configured to return, in response to its activation, a list of parameters values, and/or indication that the calculation is impossible to perform for the said one or several manufacturing step(s).

When the calculation system comprises at least an optical calculation module and at least a manufacturing calculation module, the input data may comprise a request to calculate values of the optical parameters and values of the manufacturing process parameters. Here, the input data further comprise prescription data for the wearer of the ophthalmic lens.

The input data may further comprise measurement data measured during the manufacturing process of the ophthalmic lens, operation state data related to an equipment of the ophthalmic lens manufacturing system, and/or process change data related to a change in the manufacturing process.

The managing unit may be configured to determine an order of activation of the one or several calculation module(s) to be activated, through one or several iteration(s) of:
  determining a first calculation module impacted by the input data,
  determining a second calculation module impacted by a parameter value calculated by the first calculation module.

The managing unit may be configured to use predetermined priority rules related to the calculation modules to determine the order of activation of the one or several calculation module(s) to be activated.

Another aspect of the invention is directed to a calculation method for manufacturing an ophthalmic lens, in a calculation system comprising a set of calculation modules 1 to N, N being an integer higher than or equal to 1, each calculation module being associated to a partial calculation in relation with manufacturing process of said ophthalmic lens, each calculation module being configured to be activated independently and asynchronously from another calculation module, the method comprising, at a managing unit: a receiving step during which input data are received, the input data being related to the manufacturing process and/or to an ophthalmic lens manufacturing system configured to manufacture the ophthalmic lens,
  a calculating step during which output data related to the manufacturing process are calculated from the input data, through one or several iteration(s) of:
    determining one or several calculation module(s) to be activated,
    determining an order of activation of the one or several calculation module(s) to be activated,
    activating the determined one or several calculation module(s), in accordance with the determined order of activation, and
  a transmitting step during which an indication that the output data have been calculated is transmitted to the ophthalmic lens manufacturing system, the output data being available to the ophthalmic lens manufacturing system.

Another aspect of the invention relates to a computer program product comprising one or more stored sequences of instructions that are accessible to a processor and which, when executed by the processor, causes the processor to carry out the steps according to an embodiment of the method.

Another aspect of the invention relates to a computer readable medium carrying one or more sequences of instructions of the computer program product.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawing wherein.

DETAILED DESCRIPTION OF THE DRAWINGS

Elements in the Figures are illustrated for simplicity and clarity and have not necessarily been drawn to scale. For example, the dimensions of some of the elements in the figures may be exaggerated relative to other elements to help improve the understanding of the embodiments of the present invention.

Figure 1:
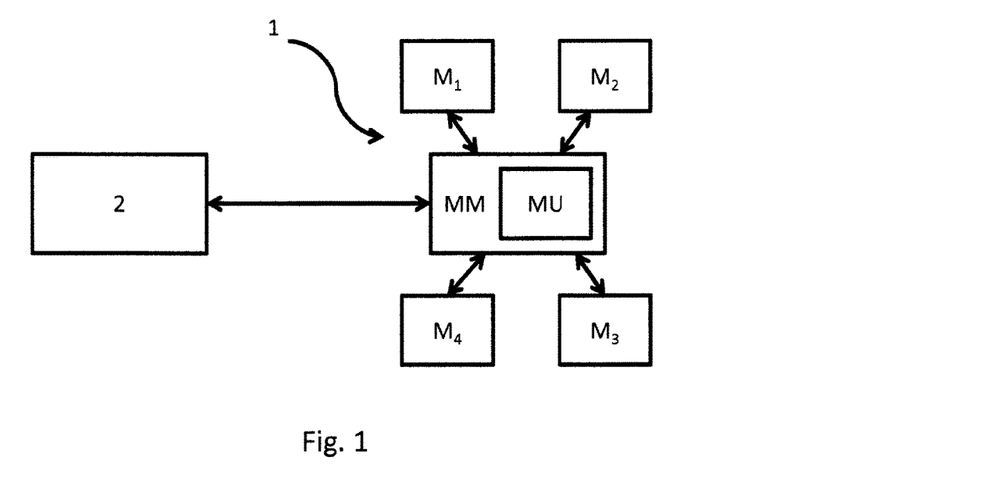
FIG. 1 is a functional view of a calculation system according to an embodiment of the invention.

FIG. 1 shows a calculation system 1 for manufacturing an ophthalmic lens according to an embodiment of the invention.

In the context of the present invention, the term "ophthalmic lens" can refer to a lens blank, an uncut lens, or a semi-finished lens.

The calculation system 1 comprises a set of calculation modules $M_1$ to $M_N$, N being an integer higher than or equal to 1. According to the example embodiment represented in FIG. 1, N=4.

Each calculation module $M_1$ to $M_4$ is associated to a partial calculation in relation with manufacturing process of said ophthalmic lens. In the context of the present invention, the term "partial calculation" refers to a portion of the complete manufacturing process of the ophthalmic lens. When the calculation system 1 comprises a single calculation module $M_1$ (N=1), the term "each calculation module" refers to the calculation module $M_1$.

Each calculation module $M_i$ is configured to be activated independently and asynchronously from another calculation module $M_j$, with i an integer such as $1 \leq i \leq N$, and j an integer such as $1 \leq j \leq N$ and $j \neq i$.

The set of calculation modules $M_1$ to $M_4$ may comprise one or several optical calculation module(s), and/or one or several manufacturing calculation module(s). For instance, the calculation system 1 may comprise one optical calculation module $M_1$ and three manufacturing calculation modules $M_2$ to $M_4$.

An optical calculation module $M_1$ is configured to calculate values of optical parameters related to the ophthalmic lens to be manufactured.

A manufacturing calculation module $M_2$, $M_3$, $M_4$ is configured to calculate values of ophthalmic lens manufacturing process parameters. The manufacturing calculation module $M_2$, $M_3$, $M_4$ may be associated to the manufacturing side. It may be arranged for instance in the ophthalmic lab comprising the manufacturing apparatus.

The set of calculation modules $M_1$ to $M_4$ may further comprise one or several other calculation module(s), for instance a control data calculation module, a process validation calculation module, a Job Ticket managing calculation module, a statistical calculation module, a calculation system related data calculation module, and/or any type of calculation module in relation with manufacturing process of the ophthalmic lens.

The calculation system 1 further comprises at least one managing unit MU.

According to the embodiment of the invention represented in FIG. 1, the managing unit MU is embedded in a master module MM. In this embodiment, each calculation module $M_1$ to $M_N$ is a slave calculation module configured to be activated by the master module MM.

Figure 2:
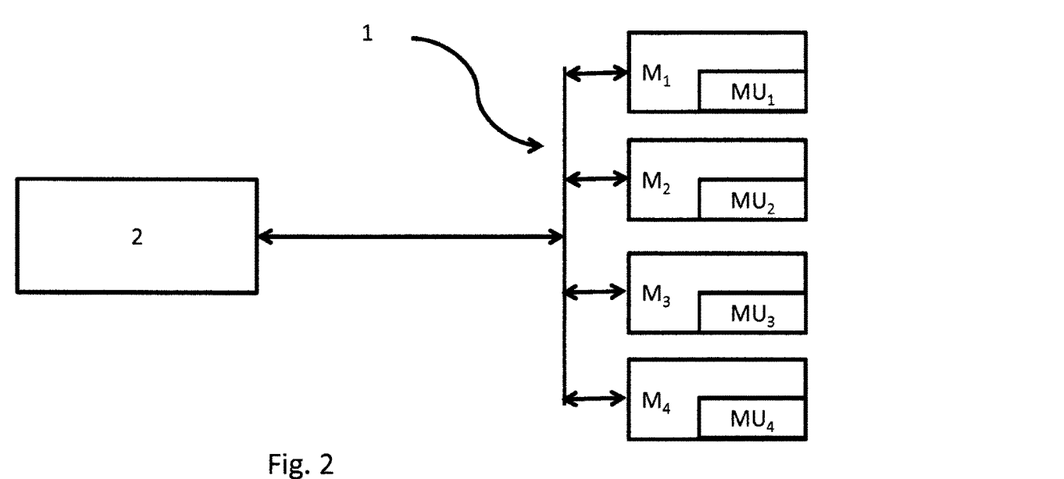
FIG. 2 is a functional view of a calculation system according to another embodiment of the invention.

According to another embodiment of the invention represented in FIG. 2, the calculation system 1 comprises N managing units $MU_1$ to $MU_N$, each calculation module $M_i$ comprising one managing units $MU_i$. In this embodiment, when the calculation system 1 comprises several calculation modules $M_1$ to $M_4$, one of the calculation modules $M_1$ to $M_4$ is determined as managing module for an output data calculation. For instance, the calculation module $M_1$ to $M_4$ determined as managing module for an output data calculation is the first calculation module $M_1$ to $M_4$ receiving, from a remote device 2, input data related to the output data calculation.

In this embodiment, when the managing module receives input data, it determines a list of calculation modules to be activated and an order of activation, or it determines whether a predetermined list has to be updated. If a predetermined list has to be updated, the managing module updates the predetermined list.

Then, the managing module determines whether it has to perform a calculation. If it has to perform a calculation, the managing module performs the said calculation, updates the input data, and determines whether the list has to be updated.

Then, the managing module transmits the input data, or the updated input data, to the next calculation module to be activated according to the current list.

Then, the calculation module receiving the data performs the corresponding calculation, updates the input data, and determines whether the list has to be updated. The data are updated and transmitted in the same way until the last calculation has been performed. Then, the output data are made available to the ophthalmic lens manufacturing system, as disclosed below.

Each managing units $MU_1$ to $MU_N$ is similar to the managing unit MU of FIG. 1.

The managing unit MU comprises receiving means configured to receive input data. The input data are received from a remote device 2, which may be, for instance, a managing entity (LMS) of the ophthalmic lab, or an ophthalmic lens calculator of a remote ophthalmic lens designer.

The input data may comprise calculated data and/or measured data. The input data may be related to the manufacturing process and/or to an ophthalmic lens manufacturing system configured to manufacture the ophthalmic lens.

The manufacturing process related data may comprise optical and/or manufacturing calculation request. The type of calculation requests which can be handled by the calculation system 1 depend on the calculation modules $M_1$ to $M_4$ included in the calculation system.

For instance, when the set of calculation modules $M_1$ to $M_4$ comprises at least one optical calculation module, the input data may comprise an optical calculation request. When the set of calculation modules $M_1$ to $M_4$ comprises at least one manufacturing module, the input data may comprise a manufacturing calculation request. When the set of calculation modules $M_1$ to $M_4$ comprises at least one optical calculation module and at least one manufacturing calculation module, the input data may comprise an optical and/or manufacturing calculation request.

The manufacturing calculation request may specify one or several manufacturing step(s) to be performed.

The manufacturing process related data further comprises the data which are useful for performing the optical and/or manufacturing calculation, for instance order request data, optical data, manufacturing process data, and/or measurement data.

The order request data comprise at least prescription data of the wearer of the ophthalmic lens. The prescription data comprise a set of optical characteristics such as spherical power, cylindrical power, cylinder axis, addition power, and prescribed prism, determined by an ophthalmologist in order to correct the vision defects of the wearer. The order request may further comprise other wearer's parameters, such as a head/eye movement coordination parameter and/or an eye rotation center position.

The optical data comprise geometrical data related to the ophthalmic lens to be manufactured. The geometrical data may comprise data related to a front surface of the ophthalmic lens, data related to a back surface of the ophthalmic lens, data related to a relative position of the front and back surfaces, and/or data related to a shape of the ophthalmic lens.

The measurement data comprise data measured during the manufacturing process of the ophthalmic lens.

The ophthalmic lens manufacturing system refers to a combination of a management entity (LMS) and associated manufacturing equipments or apparatus. The ophthalmic lens manufacturing system may also include an ordering system, for instance an ordering system of an eye care practitioner or an ordering system based on an individual internet access.

The ophthalmic lens manufacturing system related data may comprise operation state data related to an equipment of the ophthalmic lens manufacturing system, and/or process change data related to a change in the manufacturing process.

The operation state data may comprise data related to a wear state of an equipment of the ophthalmic lens manufacturing system.

The process change data may comprise data related to a change of process decided by the manufacturer, for instance data related to a change of topcoat to be used.

The managing unit MU further comprises calculation means configured to calculate, from the input data, output data related to the manufacturing process. The output data may be calculated by:
  determining one or several calculation module(s) $M_1$ to $M_N$ to be activated,
  determining an order of activation of the one or several calculation module(s) $M_1$ to $M_N$ to be activated, and
  activating the determined one or several calculation module(s) $M_1$ to $M_N$, in accordance with the determined order of activation.

The determination of an order of activation aims at calculating the manufacturing process data associated with each equipment in chronological order. This order is important because of the dependences of certain process steps on the previous.

For example, the surfacing, polishing and engraving steps depend on how the lens was blocked (e.g. initial and final thicknesses, orientation of the lens member). This implies that the blocking parameters must be calculated first in order to calculate the remaining steps of the process.

In the same way, the polishing calculation depends on a lens surface state parameter, which may have a value calculated by a surfacing module.

In the same way, the engraving calculation depends on a coloration process parameter, which may have a value calculated by a coloration module.

Figure 3:
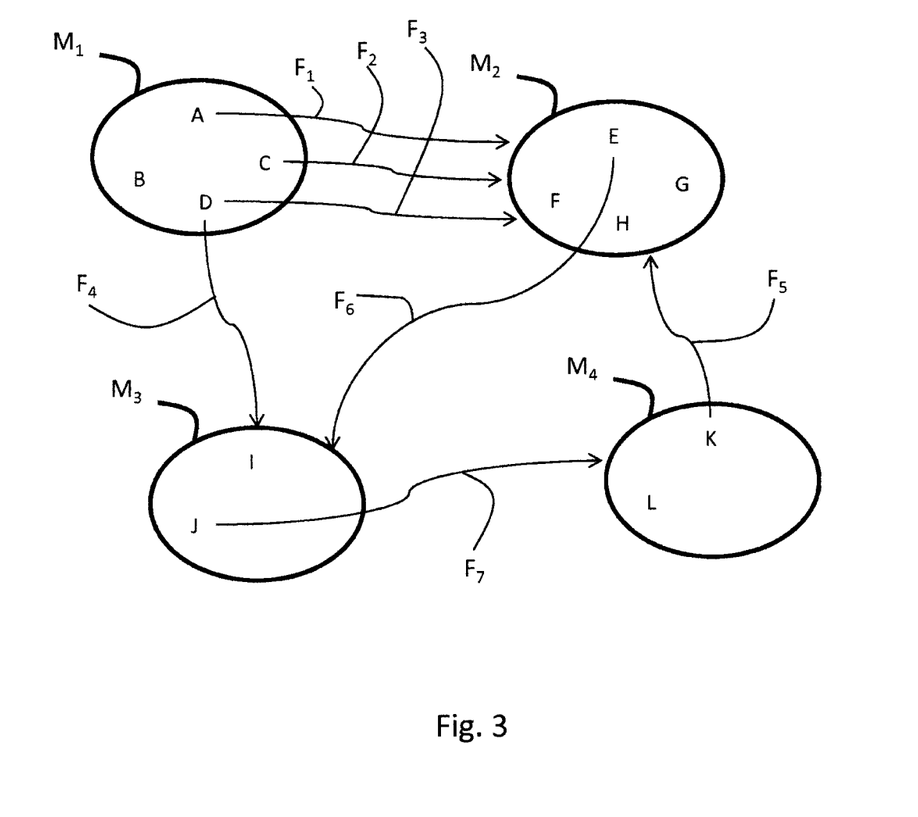
FIG. 3 is schematic view showing dependences of calculation modules in respect with parameters values calculated by other calculation modules.

FIG. 3 represents a general illustration of these dependences. We consider here that the calculation module $M_1$ is configured to calculate values of parameters A, B, C and D, the calculation module $M_2$ is configured to calculate values of parameters E, F, G and H, the calculation module $M_3$ is configured to calculate values of parameters I and J, and the calculation module $M_4$ is configured to calculate values of parameters K and L.

In the represented example, the calculation module $M_2$ depends on the values of the parameters A, C and D calculated by the calculation module $M_1$, as symbolized by the arrows $F_1$, $F_2$ and $F_3$. The calculation module $M_3$ depends on the value of the parameter D calculated by the calculation module $M_1$, as symbolized by the arrow $F_4$. The calculation module $M_2$ depends on the value of the parameter K calculated by the calculation module $M_4$, as symbolized by the arrow $F_5$. The calculation module $M_3$ depends on the value of the parameter E calculated by the calculation module $M_2$, as symbolized by the arrow $F_6$. And the calculation module $M_4$ depends on the value of the parameter J calculated by the calculation module $M_3$, as symbolized by the arrow $F_7$.

To manage these multiple dependences, the output data may be calculated through one or several iteration(s). For instance, the order of activation of the one or several calculation module(s) to be activated may be determined through one or several iteration(s) of:
  determining a first calculation module impacted by the input data,
  determining a second calculation module impacted by a parameter value calculated by the first calculation module.

Referring to FIG. 3, we are considering that the input data comprise measured data related to the parameter A.

During a first iteration, it is determined that the module $M_2$ is a first module impacted by the input data. Then, it is determined that the module $M_3$ is a second module impacted by the value of the parameter E recalculated by the module $M_2$.

During a second iteration, it is determined that the module $M_4$ is a third module impacted by the value of the parameter J recalculated by the module $M_3$.

The number of iterations is not limited. It is thus possible to determine a subset of calculation modules impacted by any type of input data, and to activate these calculation modules, in a suitable order. Consequently, it is possible to improve the precision of the calculation process, without having to perform a complete recalculation for each new input data.

When two calculation modules $M_1$ to $M_4$ are impacted during a same iteration, the order of activation may be determined by further using predetermined priority rules related to the calculation modules $M_1$ to $M_4$.

According to some embodiments of the invention, a manufacturing calculation module $M_1$ to $M_4$ is configured to return, in response to its activation, a list of parameters values, and/or indication that the calculation is impossible to perform for the said one or several manufacturing step(s). This feature aims at being alerted as soon as possible when a calculation is impossible to perform.

The managing unit MU further comprises transmitting means configured to transmit, to the ophthalmic lens manufacturing system, an indication that the output data have been calculated, and to make the output data available to the ophthalmic lens manufacturing system.

The output data may be made available by transmitting the output data to the ophthalmic lens manufacturing system, directly or via another device.

Alternatively, the output data may be made available by storing the output data in a calculation module $M_1$ to $M_4$, or in the master module MM, or in another device. In this alternative, an indication that the output data are available may be sent to the ophthalmic lens manufacturing system.

The output data may further specify one or several manufacturing step(s) to be performed.

Figure 4:
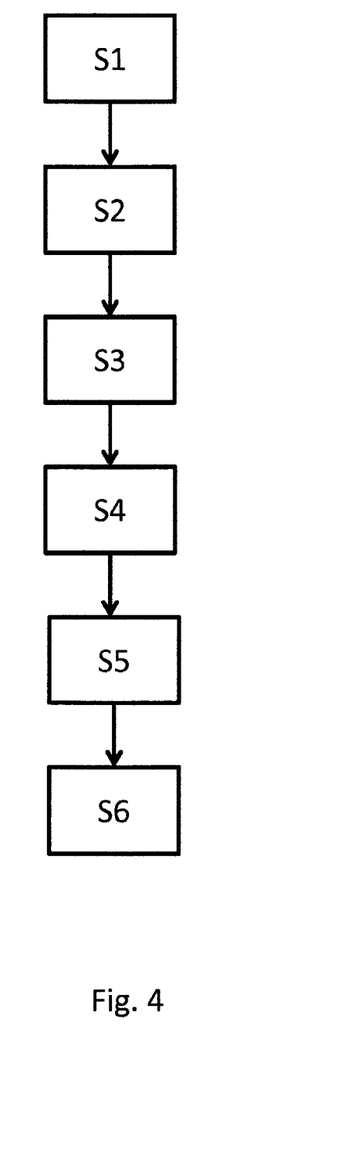
FIG. 4 is a flow chart showing steps of a calculation method for manufacturing an ophthalmic lens according to an embodiment of the invention.

FIG. 4 represents steps of a calculation method for manufacturing an ophthalmic lens, according to an embodiment of the invention. The method may be implemented by the calculation system 1 disclosed above. The method comprises:
- a first receiving step S1,
- a calculating step S2,
- a first transmitting step S3,
- a second receiving step S4,
- a recalculating step S5, and
- a second transmitting step S6.

During the receiving step S1, input data are received at a managing unit MU.

When the calculation system 1 comprises a master module MM, the managing unit MU is embedded in the master module MM.

When each calculation modules $M_1$ to $M_4$ comprise a managing unit MU, the calculation module $M_i$ associated to the managing unit MU that first receives the input data is determined as being the managing module for the steps S2 and S3.

During the calculating step S2, the output data related to the manufacturing process are calculated from the input data.

As explained above, the calculating step S2 may comprise one or several iteration(s) of:
- determining one or several calculation module(s) to be activated,
- determining an order of activation of the one or several calculation module(s) to be activated, and
- activating the determined one or several calculation module(s), in accordance with the determined order of activation.

During the transmitting step S3, the output data are made available to the ophthalmic lens manufacturing system, and an indication that the output data have been calculated is transmitted to the ophthalmic lens manufacturing system.

During the second receiving step S4, updated input data are received at a managing unit MU. The updated input data are, for instance, data measured during the manufacturing of the ophthalmic lens. The updated input data may for instance comprise blocking position error data measured after the blocking step of the lens, measured prism deviation, or measured blocking material thickness error.

When each calculation modules $M_1$ to $M_4$ comprise a managing unit MU, the calculation module $M_j$ associated to the managing unit MU that first receives the input data in step S4 may be different than the calculation module $M_i$ determined as being the managing module in step S1.

During the second calculation step S5, the output data dependent of the measured data are recalculated from the actual measured data. For instance, the blocking data dependent of the blocking position, such as the blocking material quantity, may thus be recalculated from the actual position data. The second calculation step S5 is similar to the calculation step S3, but is performed based on updated input data.

During the transmitting step S6, the updated output data are made available to the ophthalmic lens manufacturing system, and an indication that the output data have been calculated is transmitted to the ophthalmic lens manufacturing system.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A calculation system for manufacturing an ophthalmic lens, comprising:
- a processor;
- a set of calculation modules 1 to N, N being an integer higher than 1, each calculation module being implemented by the processor and associated to a partial calculation in relation with a manufacturing process of said ophthalmic lens, each calculation module activated independently and asynchronously from another calculation module,
- a managing program implemented by a memory and the processor, wherein the memory stores sequences of instructions that are accessible to the processor and executed by the processor, causes the processor to:
  - receive input data from a remote device, the input data being related to the manufacturing process of said ophthalmic lens and/or to an ophthalmic lens manufacturing system that manufactures the ophthalmic lens,
  - calculate output data related to the manufacturing process of said ophthalmic lens from the input data, through one or several iteration(s) of:
    - determining several calculation modules to activate,
    - determining an order of activation of the several calculation modules to be activate,
    - activating the determined several calculation modules, in accordance with the determined order of activation, and
  - transmit, to the ophthalmic lens manufacturing system, an indication that the output data have been calculated, and make the output data available to the ophthalmic lens manufacturing system,
- the ophthalmic lens manufacturing system manufacturing the ophthalmic lens based on the output data received by the ophthalmic lens manufacturing system.

2. The calculation system according to claim 1, wherein the managing program is embedded in a master module, each calculation module being a slave calculation module activated by the master module.

3. The calculation system according to claim 1, comprising N managing programs, each calculation module comprising one of the said N managing programs, one calculation module being determined as managing module for an output data calculation, depending on the received input data.

4. The calculation system according to claim 1, wherein the set of calculation modules comprises at least one optical calculation module that calculates values of optical parameters related to the ophthalmic lens that is manufactured, the optical parameters comprising geometrical parameters related to the ophthalmic lens.

5. The calculation system according to claim 4, wherein the input data comprise a request to calculate values of the optical parameters, the input data further comprising prescription data for a wearer of the ophthalmic lens.

6. The calculation system according to claim 1, wherein the set of calculation modules comprises at least one manufacturing calculation module that calculates values of ophthalmic lens manufacturing process parameters.

7. The calculation system according to claim 6, wherein a request to calculate values of the ophthalmic lens manufacturing process parameters specifies several manufacturing step(s) to be performed.

8. The calculation system according to claim 6, wherein a manufacturing calculation module returns, in response to its activation, a list of parameters values, and/or indication that the calculation is impossible to perform for the said one or several manufacturing step(s).

9. The calculation system according to claim 4, wherein the set of calculation modules comprises at least one manufacturing calculation module, that calculates values of ophthalmic lens manufacturing process parameters,
   wherein the input data comprises a request to calculate values of the optical parameters and values of the manufacturing process parameters, the input data further comprising prescription data for a wearer of the ophthalmic lens.

10. The calculation system according to claim 1, wherein the input data comprises measurement data measured during the manufacturing process of the ophthalmic lens.

11. The calculation system according to claim 1, wherein the input data comprises operation state data related to an equipment of the ophthalmic lens manufacturing system.

12. The calculation system according to claim 1, wherein the input data comprises process change data related to a change in the manufacturing process of said ophthalmic lens.

13. The calculation system according to claim 1, wherein the processor further determines the order of activation of the several calculation modules to be activated, through several iteration(s) of:
   determining a first calculation module impacted by the input data, and
   determining a second calculation module impacted by a parameter value calculated by the first calculation module.

14. The calculation system according to claim 1, wherein the processor further uses predetermined priority rules related to the one or several calculation modules to determine the order of activation of the several calculation modules to be activated.

* * * * *

UNITED STATES PATENT AND TRADEMARK OFFICE
CERTIFICATE OF CORRECTION

PATENT NO. : 10,189,220 B2
APPLICATION NO. : 14/784152
DATED : January 29, 2019
INVENTOR(S) : Laurent Marcepoil et al.

Page 1 of 1

It is certified that error appears in the above-identified patent and that said Letters Patent is hereby corrected as shown below:

On the Title Page

Item (86), the PCT information is incorrect. Item (86) should read:
--(86)  PCT No.: PCT/EP2014/057779
        §371 (c)(1),
        (2) Date: Oct. 13, 2015--

Signed and Sealed this
Third Day of September, 2019

Andrei Iancu
*Director of the United States Patent and Trademark Office*